United States Patent [19]

Callman et al.

[11] Patent Number: 4,737,058
[45] Date of Patent: Apr. 12, 1988

[54] LOCKING ARRANGEMENT FOR NUTS

[75] Inventors: Karl A. G. Callman; Lars R. Jonsson, both of Gothenburg, Sweden

[73] Assignee: AB Volvo, Gothenburg, Sweden

[21] Appl. No.: 277,203

[22] Filed: Jun. 23, 1981

[30] Foreign Application Priority Data

Jun. 24, 1980 [SE] Sweden ............................ 8004660

[51] Int. Cl.⁴ .......................... F16B 39/10; F16B 39/00
[52] U.S. Cl. ..................................... 411/120; 411/135; 411/197
[58] Field of Search ............... 411/190, 191, 192, 195, 411/196, 197, 204, 217, 219, 221, 120, 135; 308/207 R

[56] References Cited

U.S. PATENT DOCUMENTS

| Re. 1,579 | 6/1922 | Bechberger | 411/197 X |
|---|---|---|---|
| 433,730 | 8/1890 | Harker | 411/190 |
| 681,593 | 8/1901 | Tippit | 411/197 |
| 913,486 | 2/1909 | Ferguson | 411/197 |
| 1,077,670 | 11/1913 | Church | 411/221 |
| 1,320,962 | 11/1919 | Andrix | 411/201 |
| 3,670,795 | 6/1972 | Kupfrian | 411/195 |

FOREIGN PATENT DOCUMENTS

| 420512 | 11/1910 | France | 411/191 |
|---|---|---|---|
| 2260021 | 8/1975 | France . | |
| 1423329 | 4/1976 | United Kingdom . | |
| 1484219 | 1/1977 | United Kingdom . | |
| 1,540,026 | 7/1979 | United Kingdom . | |

*Primary Examiner*—Neill Wilson
*Attorney, Agent, or Firm*—Young & Thompson

[57] ABSTRACT

An arrangement for locking a nut on a spindle, e.g. for fixing roller bearings on wheel axles, comprising a lock washer with an axial pin, a lock plate and a lock ring. The lock plate has an opening with twelve corners in which a non-rotatable nut has thirteen depressions for the axial pin. The lock washer is disposed non-rotatable on the spindle, and for this purpose it can have an approximately polygonal opening for an axle portion of corresponding cross section. When the lock plate surrounds the nut and the axial pin projects into one of the depressions, the nut is fixed against turning. The lock plate is held in place by the lock ring which lies in a groove in the nut.

4 Claims, 1 Drawing Sheet

U.S. Patent    Apr. 12, 1988    4,737,058
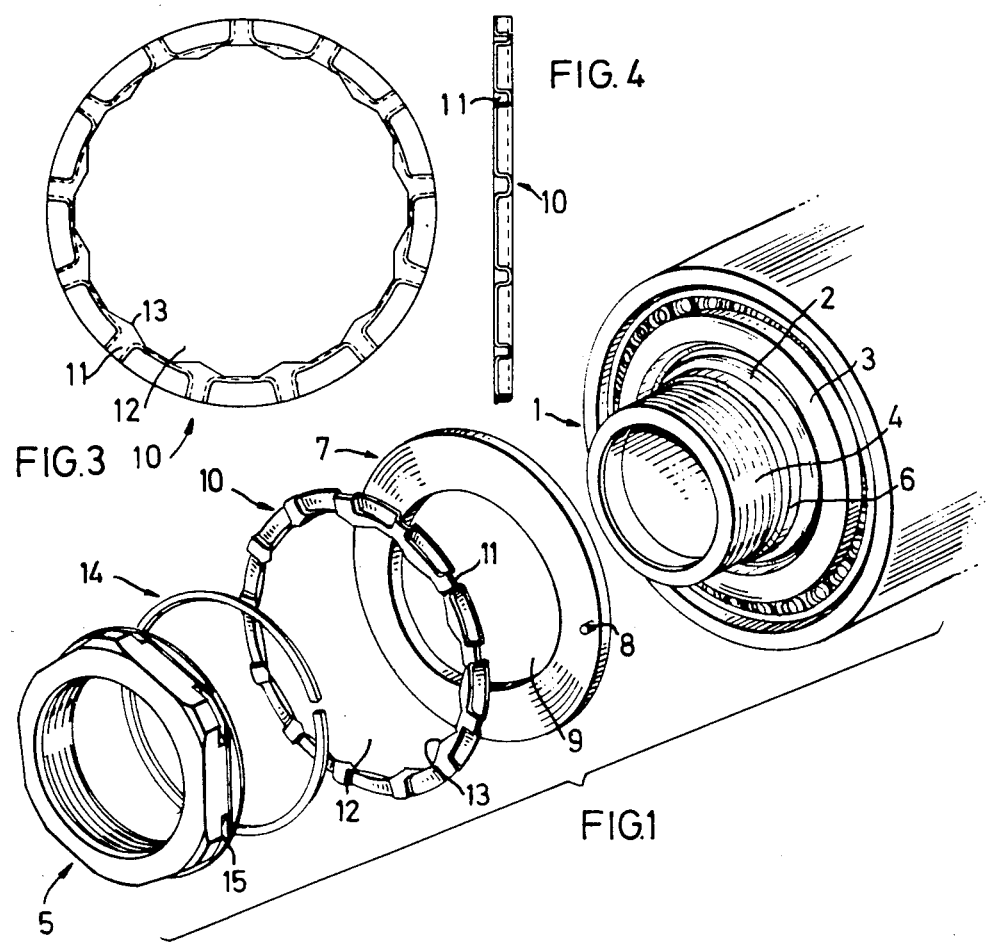
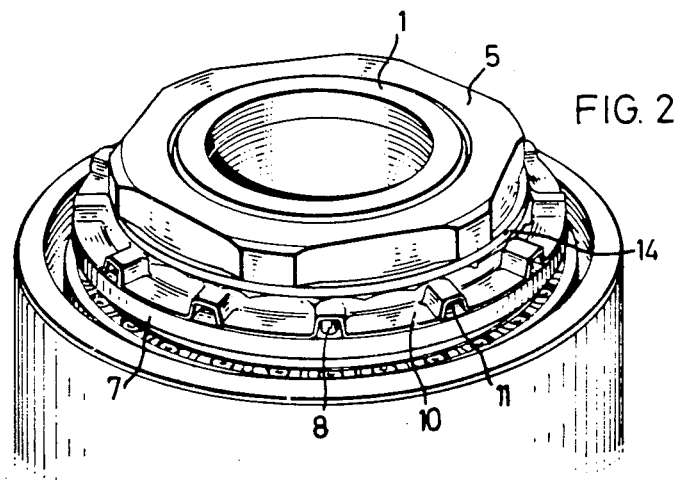

LOCKING ARRANGEMENT FOR NUTS

The present invention relates to an arrangement for locking a nut member to a spindle.

When fixing roller bearings to wheel axles in motor vehicles for example, some form of locking arrangement is always used for the nut lying outside the bearing. Said arrangement holds the bearing in place and is used to set the bearing play, so that any turning of the inner ring of the bearing will not be able to affect the position of the nut. Various types of locking arrangements are used. Very common, especially in passenger cars, is the use of a socalled castle nut, which is locked against rotation by means of a split pin in a hole in the spindle. The disadvantage of this type of locking is that there are relatively large angular steps between the different positions in which the nut can be locked. This often results in the nut having to be turned somewhat in one direction or the other after the nut has been tightened to a certain bearing play.

Another known arrangement for locking bearings to axles uses two nuts with an intermediate tongued lock washer which is fixed against rotation with the aid of a projection extending into a groove cut in the spindle. It is true that this locking arrangement permits stepless fixing of the nut, but on the other hand the setting of the bearing play is made more difficult by the fact that the outer nut, which is tightened with a predetermined torque, takes up the play of the inner nut in the thread thus changing the bearing play first set. Any turning of the inner ring of the bearing can also have an adverse effect on the lock. Also, the tongued lock washer cannot be reused.

The purpose of the present invention is to achieve a lock device which removes the above disadvatanges by, on the one hand, permitting stepless locking of the nut without the risk of changing the set bearing play and, on the other hand, permitting reuse of all the component parts.

This is achieved according to the invention by means of an arrangement comprising a lock plate arranged concentrically with the spindle and having an opening of noncircular shape in which either one of the nut or the spindle is non-rotatable, the lock plate being provided with a plurality of peripherally spaced depressions or cavities, an axially directed member non-rotatably joined to the other one of either the nut or the spindle, said member projecting into one of the depressions or cavities, and means arranged to prevent axial movement of either the lock plate or the axially projecting member towards the end of the spindle.

In a preferred embodiment, the nut is surrounded by the lock plate, and the axially projecting member is nonrotatably joined to the spindle.

In the locking arrangement according to the invention, there is no deformation of the component parts as is the case when using split pins or tongued lock washers. Rather, the locking is achieved by finding a position for the lock plate in which the nut fits into the opening in the lock plate at the same time as the axially directed member projects into one of the depressions or cavities. By making the opening in the lock plate, according to one embodiment of the invention, with twice the number of corners as there are external corners on the nut and providing the lock plate with depressions or cavities numbering one more than the number of internal corners, fixing of the nut in an arbitrary position is made possible.

The invention will be described in more detail with reference to an embodiment shown in the accompanying drawing, in which FIG. 1 shows a spindle with an exploded view of a locking arrangement according to the invention, FIG. 2 is a perspective view of the spindle with the locking arrangement mounted, and FIGS. 3 and 4 are a plan view and a side view respectively of the lock plate.

FIG. 1 shows a spindle 1 which has an interior circular portion 2 which is surrounded by the inner ring 3 of a roller bearing. The spindle 1 has a threaded end 4 on which a nut 5 is to be screwed to hold the inner ring 3 in place on the axle portion 2 and for setting the bearing play.

According to the invention the spindle 1, between the circular portion 2 and the threaded portion 4, has a portion 6 which has a rounded triangular shape. This portion 6 is intended to carry a lock washer 7 with an axial pin 8. The washer 7 has an opening 9 with a shape which fits the axle portion 6, so that the washer 7 cannot rotate on the axle portion 6.

The axial pin 8 on the washer 7 is intended to nonrotatably fix a lock plate 10 on the spindle 1. For this purpose the lock plate is made with a number of depressions 11 evenly spaced along the edge of the lock plate. When the axial pin 8 extends into one of the depressions 11, the plate is fixed against rotation on the spindle. The lock plate 10 has an opening 12 with a shape adapted to the shape of the nut 5. In the example shown, a conventional hexagonal nut 5 is used. The opening 12 in the lock plate 10 is made with twice the number of internal corners 13. To obtain a successive displacement of the position of the depressions 11 in relation to the internal corners 13, in the embodiment shown, the number of depressions is one more than the number of corners.

Finally, the locking arrangement according to the invention comprises a spring lock ring 14 which can be mounted in grooves 15 in the nut 5 in order to fix the lock plate 10 axially, as shown in FIG. 2.

During mounting, the lock washer 7 is first placed over the spindle portion 6, and the nut 5 is then tightened towards the washer, either loosely or with a predetermined torque. The lock plate 10 is held over the nut and turned, so that it can be slipped down over the nut with the pin 8 fitting into one of the depressions 11. Finally, the lock ring 14 is placed in the groove 15 of the nut, thus fixing the lock plate 10 on the spindle.

Having one more depression 11 than the number of interior corners 13 makes it possible to systematically seek the correct depression by turning the lock plate clockwise. Other numbers of depressions are possible but will then give rise to periodicity.

The width of the depressions is primarily dependent on the thickness of the pin 8. The depressions must however be wide enough so that for all possible angular configurations of nut and pin, there is a depression which fits over the pin. Finally, the width is also dependent on how large the play is between nut and lock plate. The lock plate can be made with holes or cavities instead of the depressions in the example.

Alternatively, the device according to the invention can be used for other purposes than lock nuts for bearings, for example a nut which locks a flange on an axle with splines. The lock washer can then be eliminated if the spindle is placed in the flange.

What we claim is:

1. An arrangement for locking a nut to an axle spindle comprising a lock plate having a plurality of equally peripherally spaced depressions or cavities, said plurality differing by one from twice the number of corners of the nut, and a lock washer having an axially projecting member projecting into one of the depressions or cavities, one of said lock plate and said lock washer being a nut-receiving member having a nut-receiving opening provided with a number of interior corners equal to twice the number of exterior corners of the nut, the other of said lock plate and said lock washer being non-rotatably joined to the spindle, and separate stop means engaging the nut to prevent axial movement of the nut-receiving member toward the end of the spindle.

2. An arrangement according to claim 1, characterized in that the axially projecting member is a pin which is fixed to a lock washer non-rotatably fixed to the spindle.

3. An arrangement according to claim 1, characterized in that the opening in the lock plate has twelve interior corners, and in that the lock plate has thirteen depressions or cavities.

4. An arrangement according to claim 2, characterized in that the lock washer has an opening of non-circular shape, and in that the spindle has a portion with corresponding cross section to establish non-rotatable connection between the lock washer and the spindle.

* * * * *